(12) United States Patent
Horvath et al.

(10) Patent No.: US 7,852,833 B2
(45) Date of Patent: Dec. 14, 2010

(54) SYSTEM FOR SWITCHING FROM AN ESTABLISHED MEDIA PATH TO A NEW MEDIA PATH IN A PACKET BASED NETWORK

(75) Inventors: Ernst Horvath, Vienna (AT); Karl Klaghofer, Munich (DE); Klaus Wille, Munich (DE); Rainer Zimmermann, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 586 days.

(21) Appl. No.: 11/597,427

(22) PCT Filed: May 20, 2005

(86) PCT No.: PCT/EP2005/005708

§ 371 (c)(1),
(2), (4) Date: Feb. 11, 2008

(87) PCT Pub. No.: WO2005/120114

PCT Pub. Date: Dec. 15, 2005

(65) Prior Publication Data

US 2008/0317018 A1    Dec. 25, 2008

(30) Foreign Application Priority Data

May 26, 2004    (GB) .................................. 0411701.6

(51) Int. Cl.
*H04L 12/66*    (2006.01)

(52) U.S. Cl. ...................... 370/352; 370/389; 370/401; 370/356

(58) Field of Classification Search ...................... None
See application file for complete search history.

(56) References Cited

U.S. PATENT DOCUMENTS 6,272,139 B1    8/2001    Soncodi (Continued)

FOREIGN PATENT DOCUMENTS

WO    WO 02/17036 A2    2/2002

OTHER PUBLICATIONS

European Office Action dated Jan. 30, 2008 (Five (5) pages).

(Continued)

*Primary Examiner*—Duc C Ho
(74) *Attorney, Agent, or Firm*—Crowell & Moring LLP

(57) ABSTRACT

There is described a system for switching from an established media path to a new media path for packets transmitted between first and second end points in a packet based network. An instruction is transmitted to the first end point instructing it to set up a new receiving channel for receiving packets transmitted from the second end point over the new media path. An instruction is transmitted to the second end point instructing it to configure a sending channel to send packets over the new media path for reception on the new receiving channel of the first end point. For a time period during the switching, the first end point monitors for packets simultaneously on both its new receiving channel and an established receiving channel configured to receive packets transmitted from the second end point over the established media path. This systems helps ensure a seamless switchover from the established to the new media paths.

14 Claims, 17 Drawing Sheets

U.S. PATENT DOCUMENTS

| | | | |
|---|---|---|---|
| 2001/0005372 A1* | 6/2001 | Cave et al. | 370/401 |
| 2002/0132638 A1 | 9/2002 | Plahte et al. | |
| 2002/0145998 A1* | 10/2002 | Hagirahim | 370/352 |
| 2002/0150062 A1 | 10/2002 | Zheng et al. | |
| 2002/0191561 A1 | 12/2002 | Chen et al. | |
| 2003/0091024 A1 | 5/2003 | Stumer | |
| 2004/0008630 A1 | 1/2004 | Corson et al. | |
| 2004/0022237 A1 | 2/2004 | Elliott et al. | |
| 2004/0042402 A1 | 3/2004 | Galand et al. | |
| 2005/0201358 A1* | 9/2005 | Nelson et al. | 370/352 |
| 2006/0218624 A1* | 9/2006 | Ravikumar et al. | 726/3 |
| 2007/0115945 A1* | 5/2007 | Gass et al. | 370/356 |

OTHER PUBLICATIONS

International Search Report dated Aug. 10, 2005 and Form PCT/ISA/237 (Eleven (11) pages).

Form PCT/IPEA/416 and Form PCT/IPEA/409 dated Aug. 23, 2006 (Seven (7) pages).

* cited by examiner

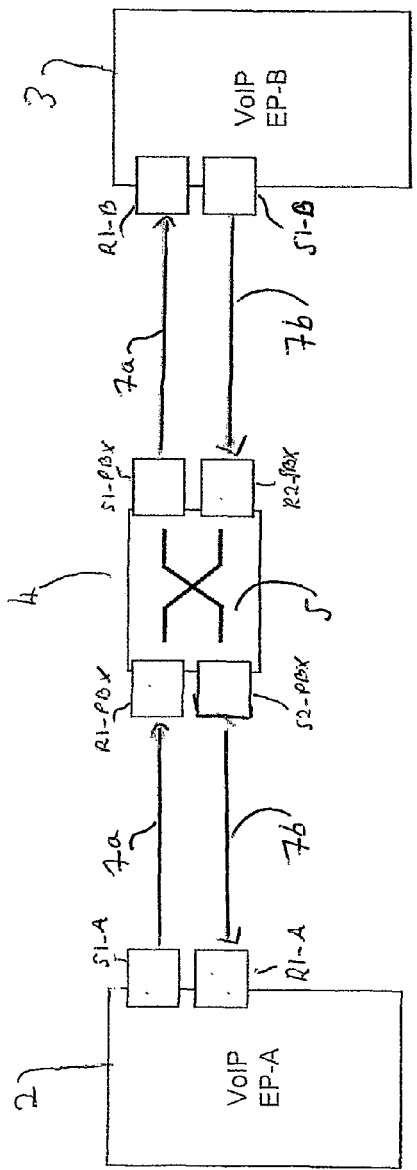
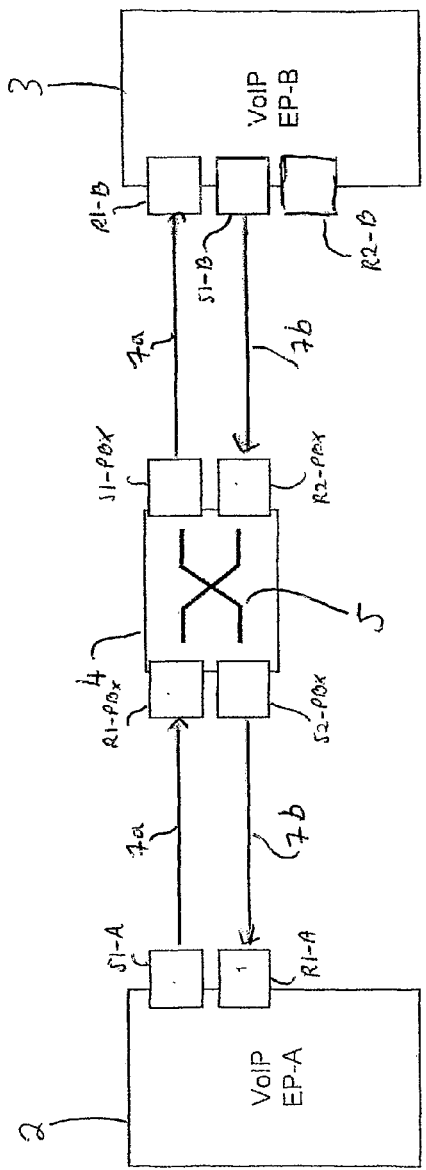
FIGURE 3
FIGURE 4

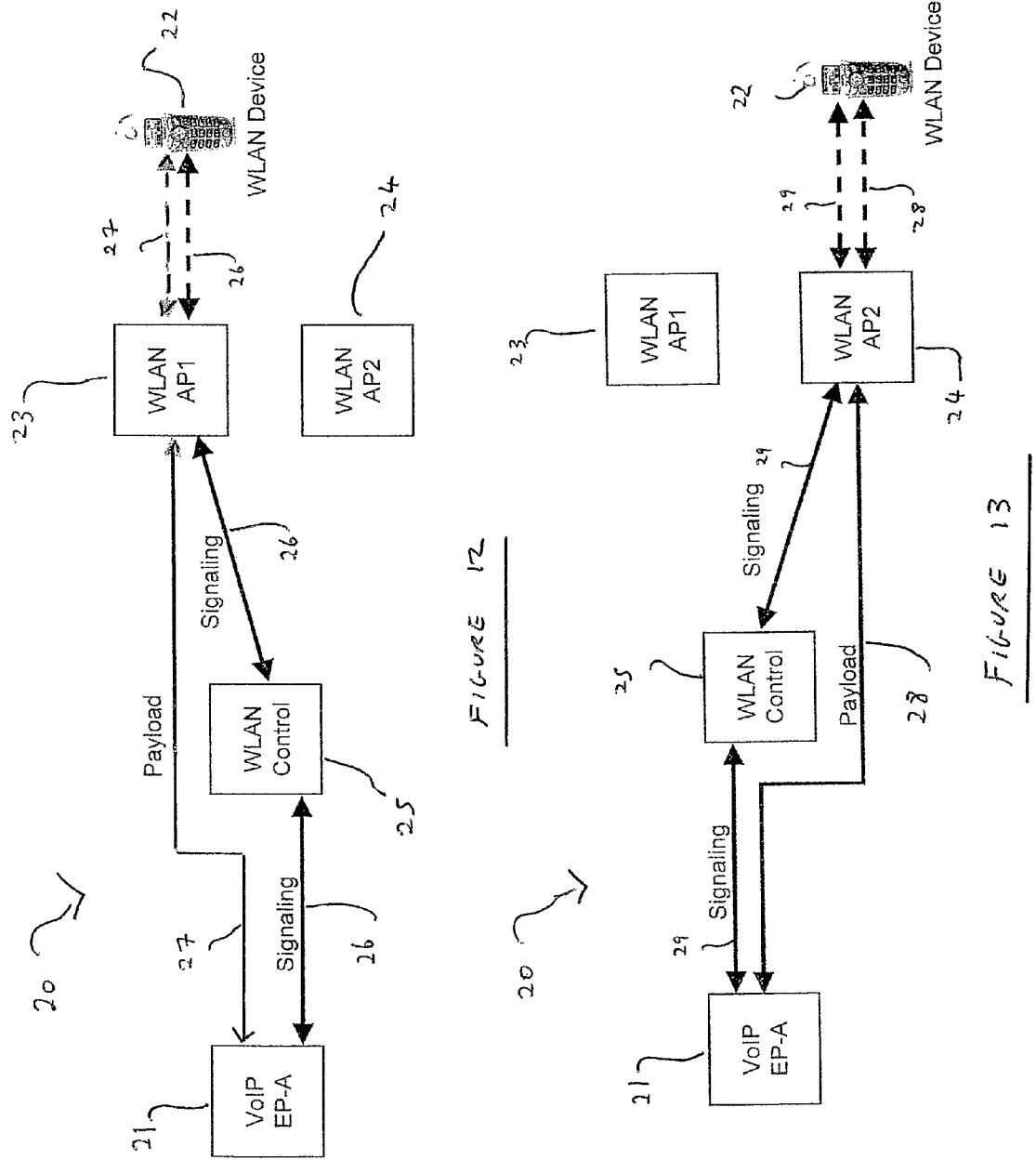

SYSTEM FOR SWITCHING FROM AN ESTABLISHED MEDIA PATH TO A NEW MEDIA PATH IN A PACKET BASED NETWORK

This invention relates to seamless media flow switching in a packet switched network.

Telecommunications has evolved towards packet based communications. A packet switched network is a network in which units of data known as packets are routed through a network based on the destination address contained in each packet. Packet switched networks are connectionless networks in which each packet in a data flow is routed independently from the other packets in that data flow to the destination. It is quite possible for different packets in the same data flow to be routed by different routes to the destination. In contrast, a circuit switched network, for example a traditional telephone system, is a connection orientated network, in which a physical path is obtained for and dedicated to a single connection between two end-points in the network for the duration of the connection.

The term Voice over IP (VoIP) denotes the provision of voice/audio services over packet switched networks using the Internet Protocol (IP). A number of international data network standards support VoIP including ITU-T H.323 and the Session Initiation Protocol (SIP).

H.323 is a protocol stack that supports VoIP by referencing specific protocols for speech coding, call setup, signaling, data transport and other areas rather than specifying these things itself. For example, the Real Time Protocol (RTP) managed by the Real Time Control Protocol (RTCP) is used for actual data transmission.

Whereas H.323 is a complete protocol suite, SIP is a single module and describes how to set up VoIP sessions. SIP just handles setup, management and termination of sessions. Other protocols such as RTP/RTCP are used for data transport. SIP is an application layer protocol and can run over User Datagram (UDP) protocol or Transmission Control Protocol (TCP).

In some circumstances it is necessary or desirable to re-route a media stream between two end points in a packet switched network. For example, in prior art systems re-routing a media stream is achieved using either the H.323 pause and re-route feature, the H.323 extended fast connect feature or the SIP offer/answer feature. None of these features provide a seamless method of payload switching. Use of all these features to re-route a payload stream between two end points results in the payload stream being interrupted for a short time before being re-connected. This may cause packets to be lost.

Embodiments of the present invention aim to alleviate this problem.

According to the present invention there is provided a system for switching from an established media path to a new media path for packets transmitted between first and second end points in a packet based network, the method comprising: transmitting an instruction to the first end point instructing it to set up a new receiving channel for receiving packets transmitted from the second end point over the new media path; transmitting an instruction to the second end point instructing it to configure a sending channel to send packets over the new media path for reception on the new receiving channel of the first end point; and wherein for a time period, the first end point monitors for packets simultaneously on both its new receiving channel and an established receiving channel configured to receive packets transmitted from the second end point over the established media path.

According to the invention there is also provided a method of operating a first end point when switching from an established media path to a new media path for packets transmitted from a second end point to the first and in a packet based network, the method comprising: setting up a new receiving channel for receiving packets transmitted from the second end point over the new media path and for a time period, monitoring for packets simultaneously on both the new receiving channel and an established receiving channel configured to receive packets transmitted from the second end point over the established media path.

The above and further features of the invention are set forth with particularity in the appended claims and together with advantages thereof will become clearer from consideration of the following detailed description of exemplary embodiments of the invention given with reference to the accompanying drawings, in which:

FIGS. 1 to 9 illustrate a first packet switched network embodying the invention;

FIGS. 12 to 20 illustrate a second packet switched network;

Figure 1:
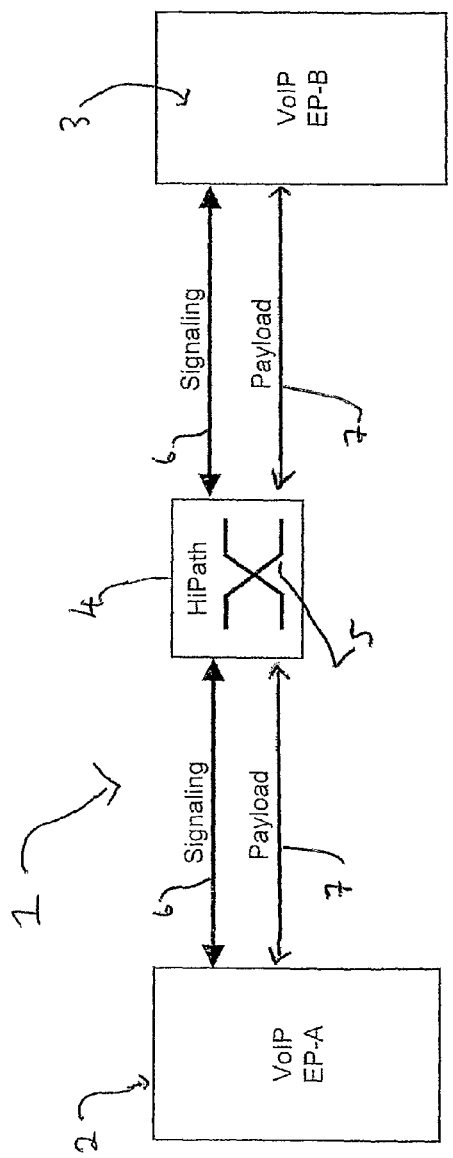

Turning now to FIG. 1 of the accompanying drawings, a communication system 1 comprises a first VoIP end point 2, a second VoIP end point 3 and a Private Branch Exchange (PBX) 4. In this embodiment, the first VoIP end point 2 and the second VoIP end point 3 are both IP telephones, for example Siemens optipoint™ 400 IP telephones. The switching matrix 5 of the PBX 4 is a Time Division Multiplexed (TDM) circuit switched matrix and the PBX 4 may for example be a Siemens HiPath™ 4000 system. The first VoIP end point 2 and the second VoIP end point 3 may each be connected to the PBX 4 via an IP-based Local Area Network (LAN) (not shown).

In this example, the first 2 and second 3 VoIP end points have an established two-way voice connection between themselves. Both the signalling path 6 and the payload path 7 of this voice connection run through the PBX 4. As mentioned above, the PBX 4 has a TDM switching matrix 5 and so the PBX 4 is provided with Linecard Gateways (not shown) for converting the IP signalling and IP payload flows received at the PBX 4 into a TDM format for transmission across the PBX 4 and subsequently back into an IP format for transmission away from the PBX 4.

Figure 2:
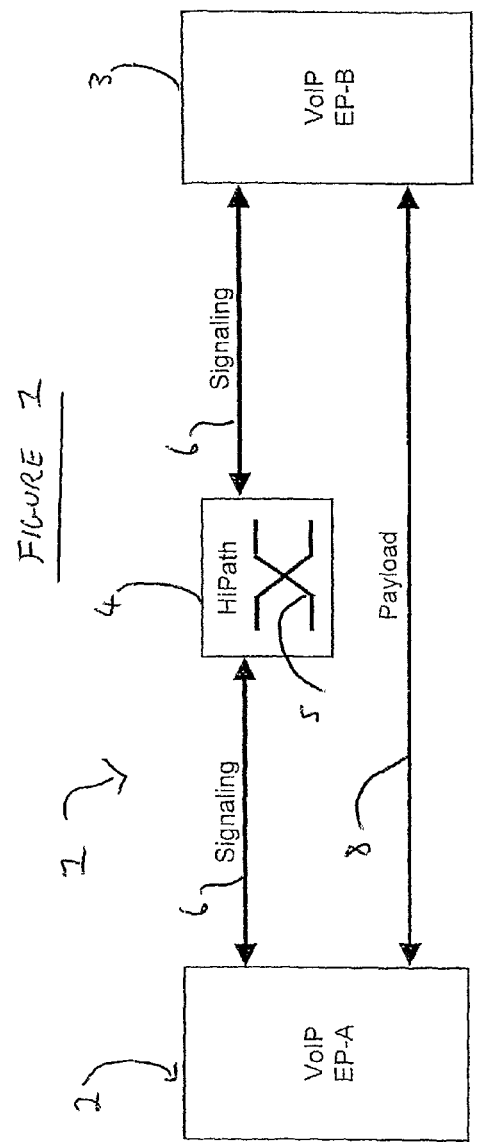
Figure 5:
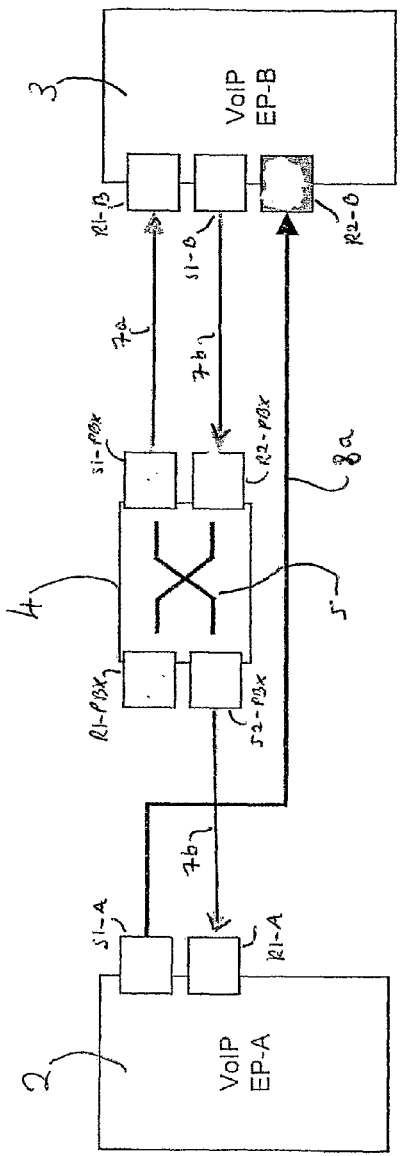
Figure 6:
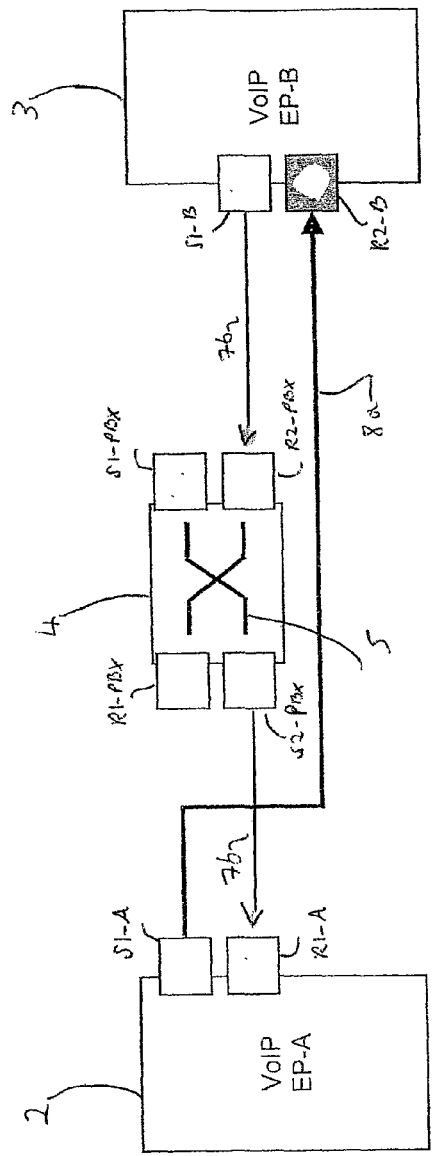
Figure 7:
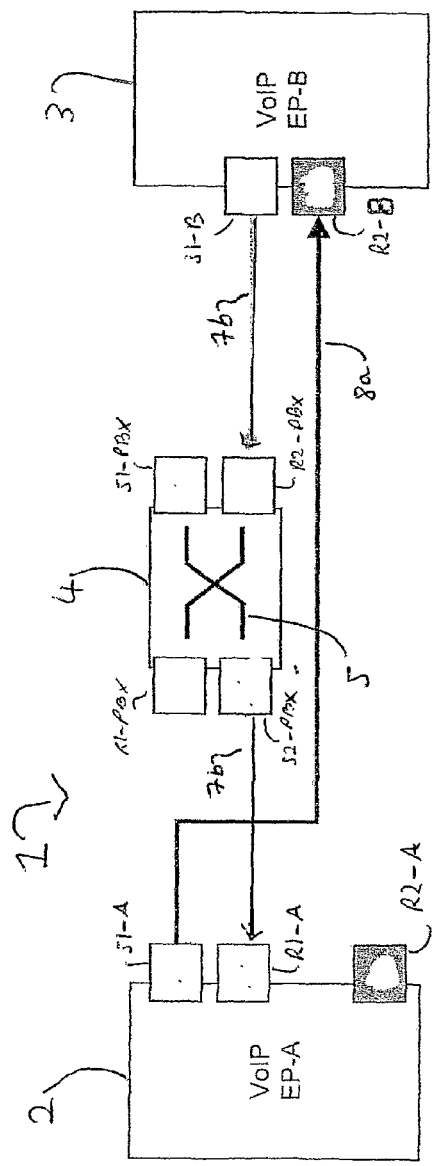
Figure 8:
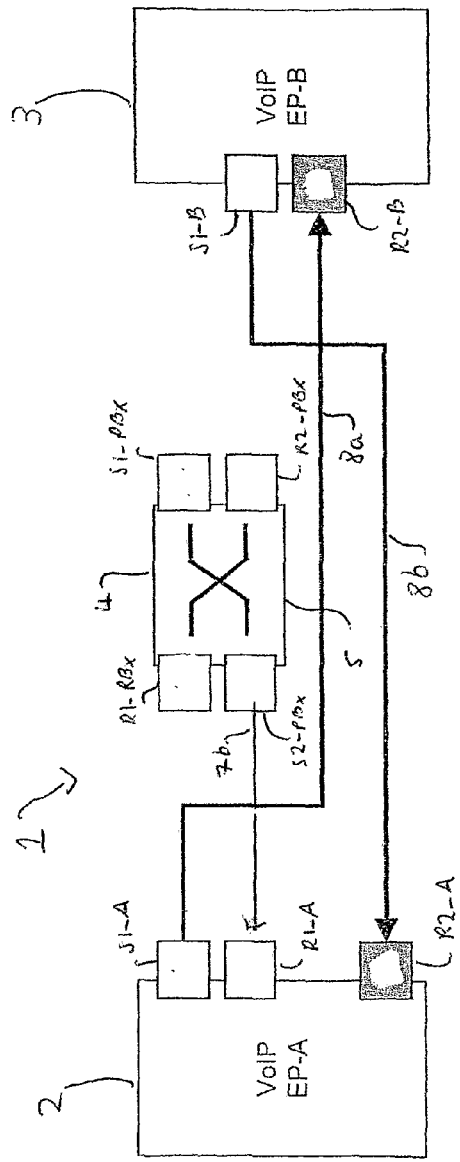
Figure 9:
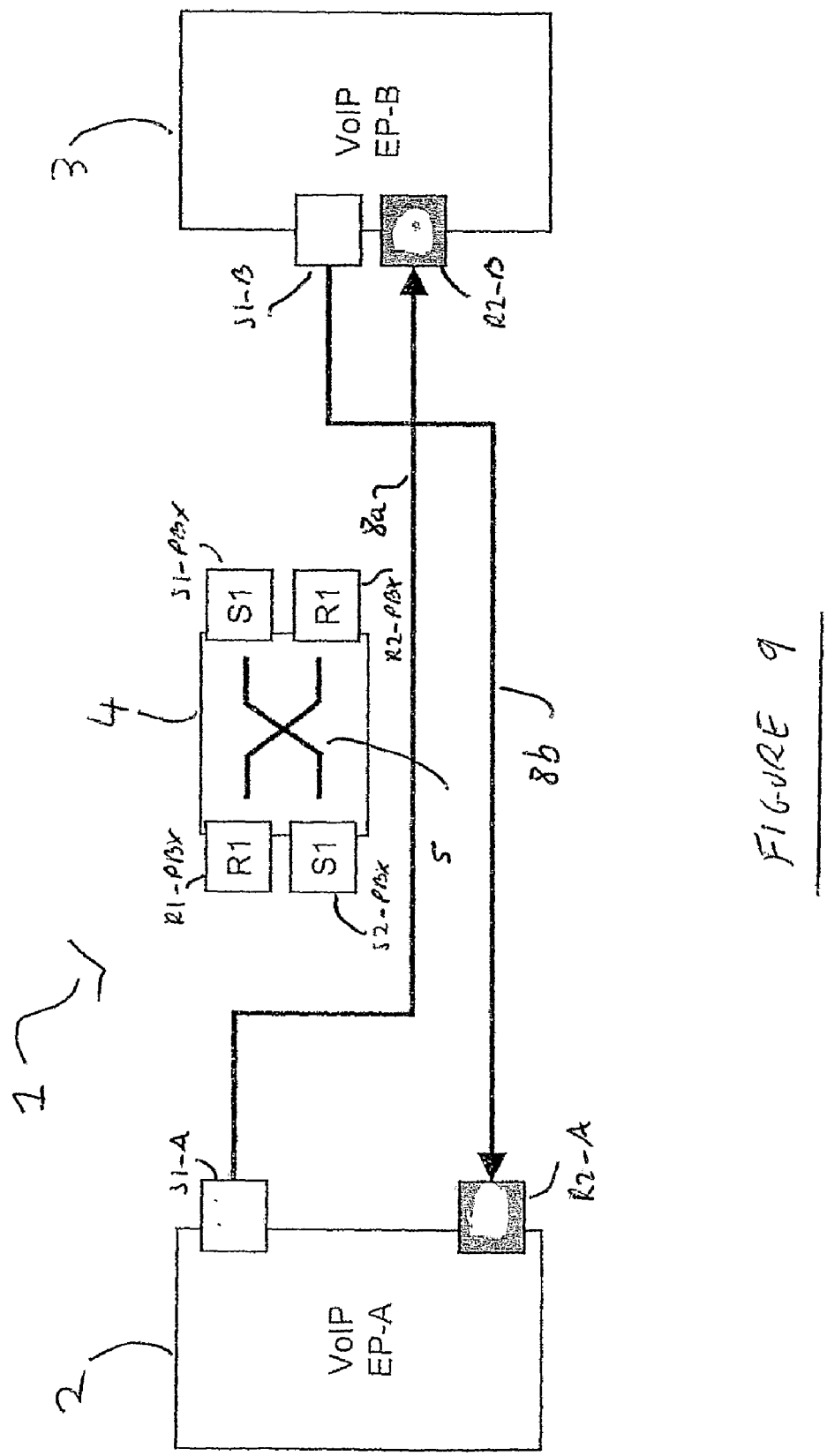
Figure 10:
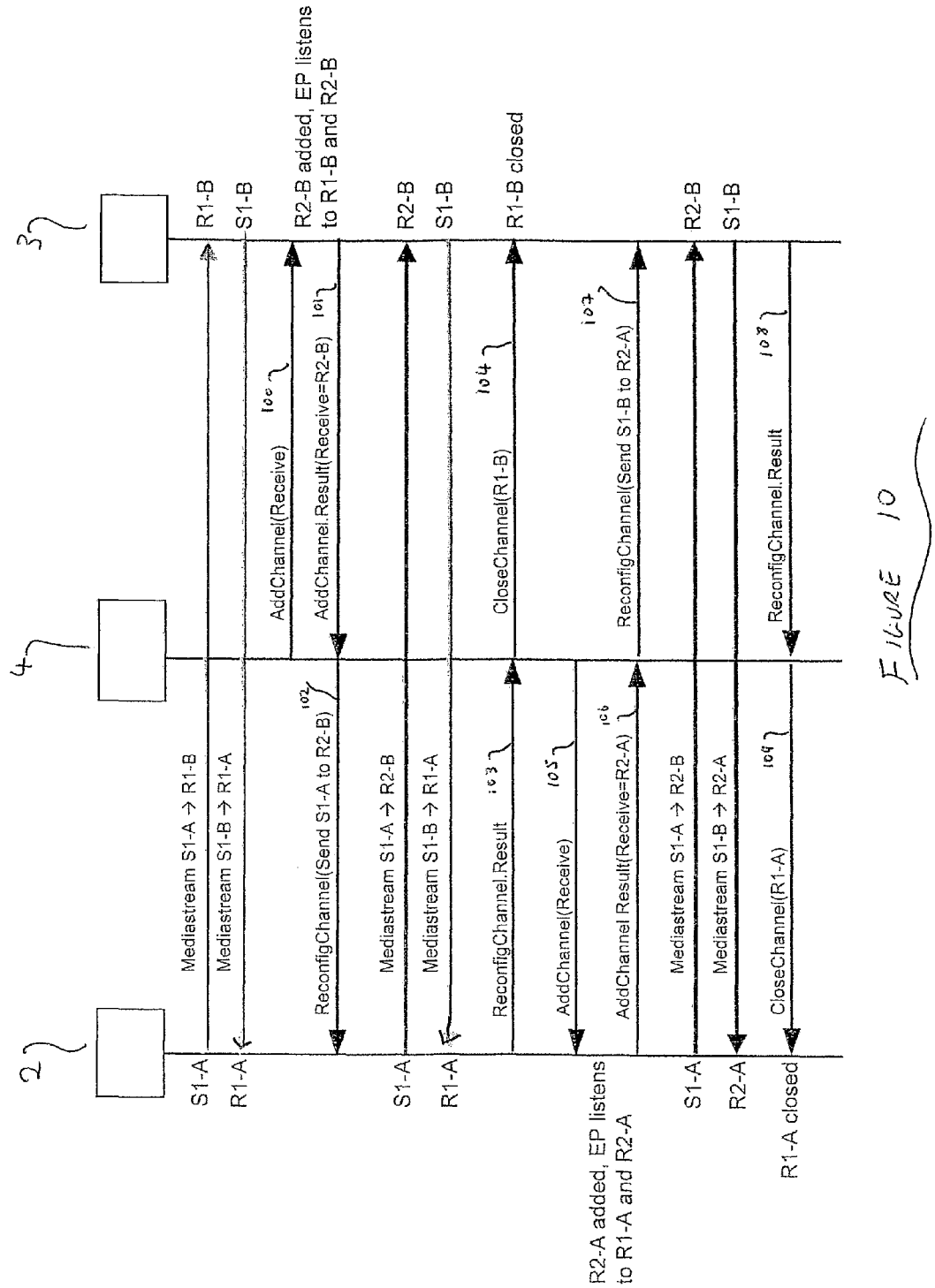
FIG. 10 illustrates a message flow diagram.

The conversion by the PBX 4 of the payload path 7 from an IP flow into a TDM flow and then back again into an IP flow increases both the latency and the jitter of the voice connection. This is undesirable. In this embodiment of the invention, after the voice connection between the first 2 and second 3 VoIP endpoints becomes stable, a new payload path 8 avoiding the PBX 4 is established and the initial payload path 7 is broken. This illustrated in FIG. 2.

Referring now to FIGS. 3 to 10, the process by which the new payload path 8 is established will be described. For simplicity, the signalling path 6 which throughout this process continues to pass through the PBX 4, is not shown in FIGS. 3 to 9.

The initial payload path 7 comprises a forward payload path 7a and a reverse payload path 7b. The first VoIP endpoint 2 transmits its payload using send channel S1-A over the forward payload path 7a to receive channel R1-B of the second VoIP endpoint 3. In this context a channel may be thought of as being defined by the IP address of the relevant end point and the port number used to transmit or receive data on. The second VoIP endpoint 3 transmits its payload using send channel S1-B over the reverse payload path 7b to receive channel R1-A of the first VoIP endpoint 2. The payload transmitted from the first VoIP end point 2 is received at the PBX 4 on receive channel R1-PBX and is transmitted from the PBX 4 on transmit channel S1-PBX. The payload transmitted from the second VoIP end point 3 is received at the PBX 4 on receive channel R2-PBX and is transmitted from the PBX 4 on transmit channel S2-PBX.

To initiate establishment of the new payload path 8, the PBX 4 sends a request to the second VoIP end point 3, step 100, to instruct it to provide an additional receive channel R2-B. The second VoIP end point 3 sets up the additional receive channel R2-B and sends a message back to the PBX 4, step 101, to inform it that the receive channel R2-B is set up. At this point, the second VoIP end point 3 listens on both receive channels R1-B and R2-B simultaneously. Next, the PBX 4 sends a message to the first VoIP end point 2, step 102, to inform it that the receive channel R2-B of the second VoIP end point 3 is set up. In response, the first VoIP end point 2 reconfigures its sending channel S1-A to begin transmitting its payload to the new receive channel R2-B of the second VoIP end point 3 on new forward payload path 8a which avoids the PBX 4. Next, the first VoIP end point 2 sends a message back to the PBX 4, step 103, to inform it that the sending channel S1-A has been reconfigured and is sending payload to the new receive channel R2-B. At step 104, the PBX 4 sends a message to the second VoIP end point 3 instructing it to close the initial receive channel R1-B, which it then does.

The PBX 4 then sends a request to the first VoIP end point 2, step 105, to instruct it to provide an additional receive channel R2-A. The first VoIP end point 2 sets up the additional receive channel R2-A and sends a message back to the PBX 4, step 106, to inform it that the receive channel R2-A is set up. At this point, the first VoIP end point 2 listens on both receive channels R1-A and R2-A simultaneously. Next, the PBX 4 sends a message to the second VoIP end point 3, step 107, to inform it that the receive channel R2-A of the first VoIP end point 2 is set up. In response, the second VoIP end point 3 reconfigures its sending channel S1-B to begin transmitting its payload to the new receive channel R2-A of the second VoIP end point 2 on new reverse payload path 8b which avoids the PBX 4. Next, the second VoIP end point 3 sends a message back to the PBX 4, step 108, to inform it that the sending channel S1-B has been reconfigured and is sending payload to the new receive channel R2-A. At step 109, the PBX 4 sends a message to the first VoIP end point 2 instructing it to close the initial receive channel R1-A, which it then does.

Figure 11:
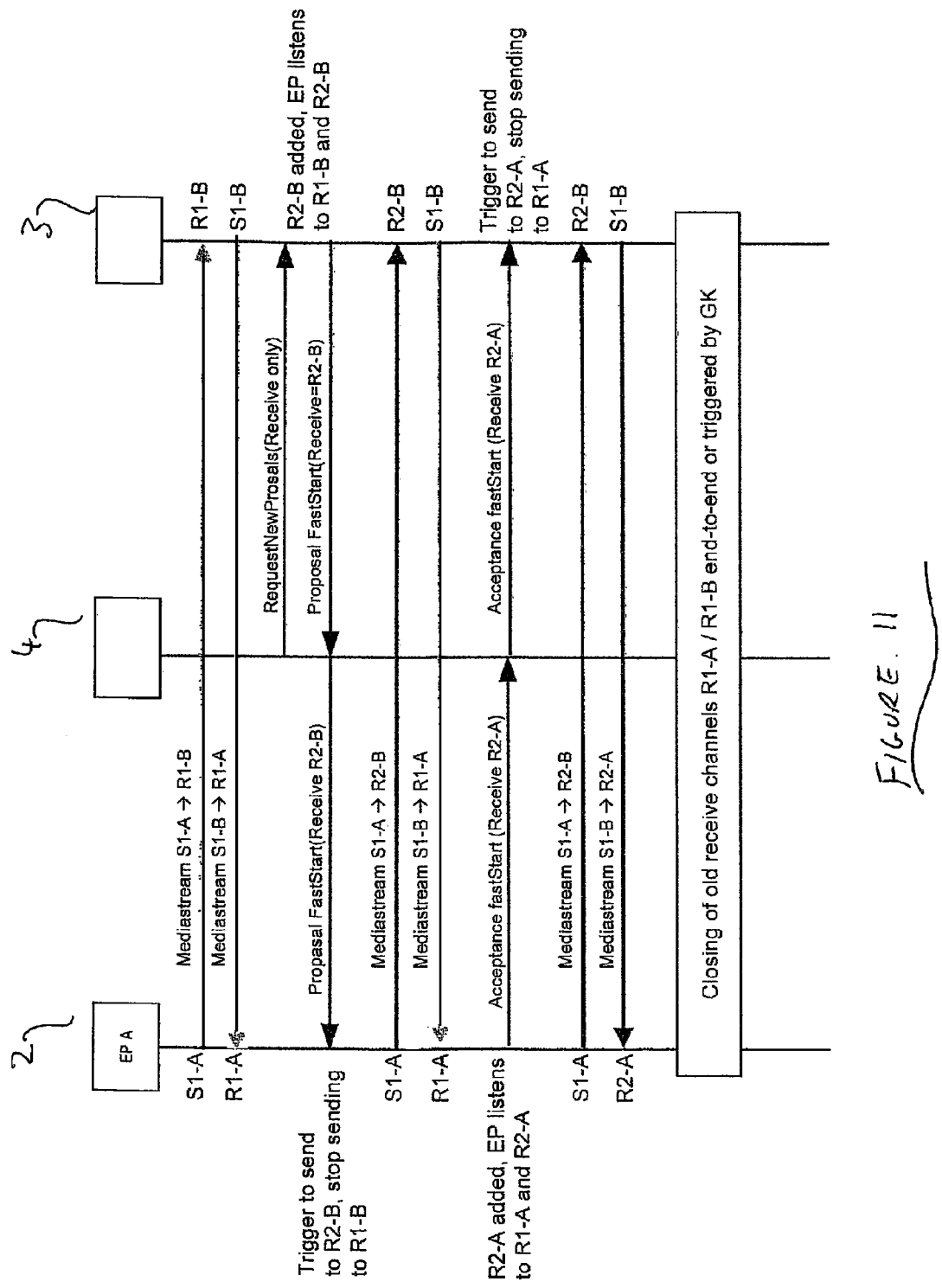
FIG. 11 illustrates another message flow diagram.
Figure 14:
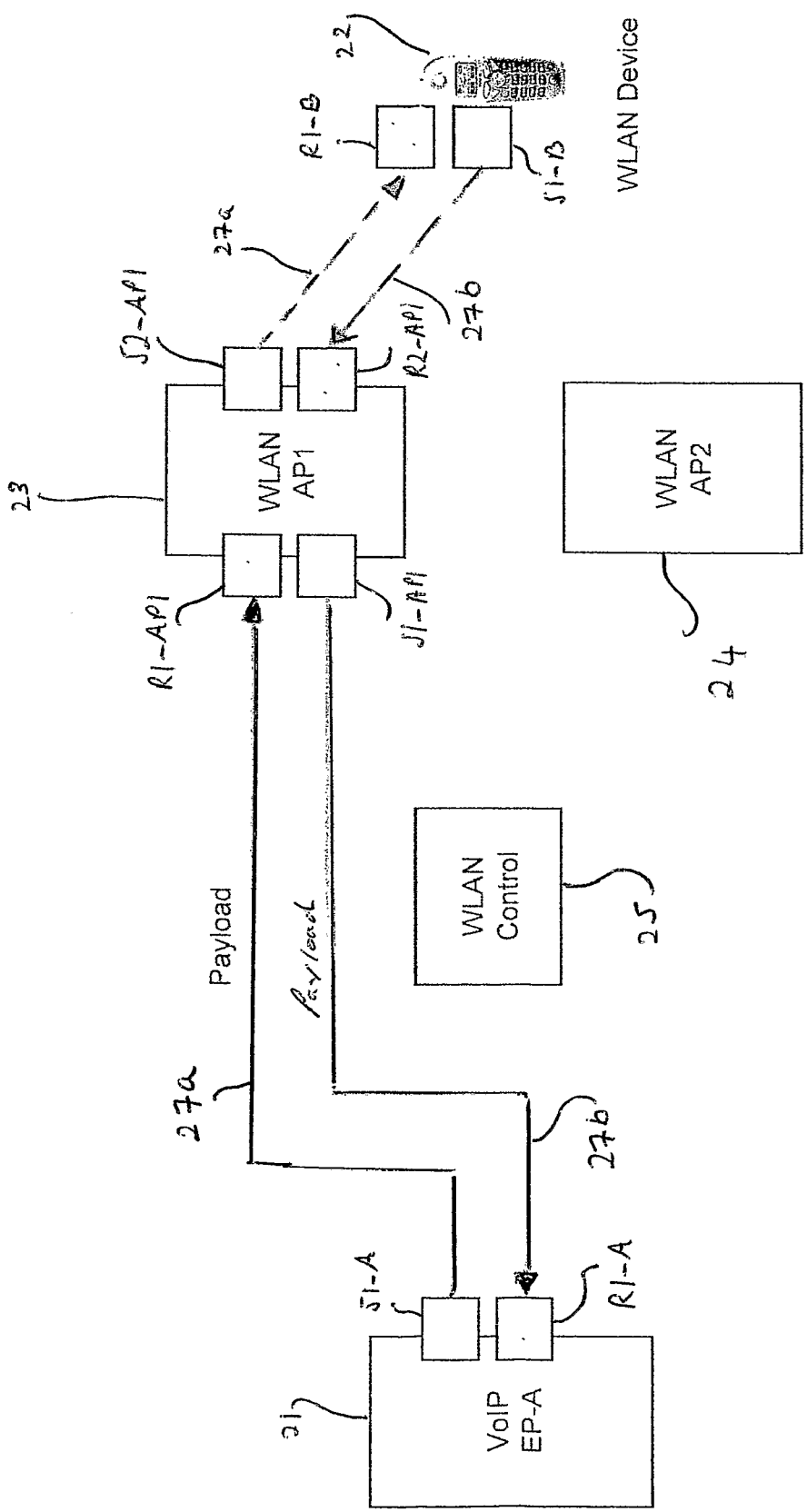
Figure 15:
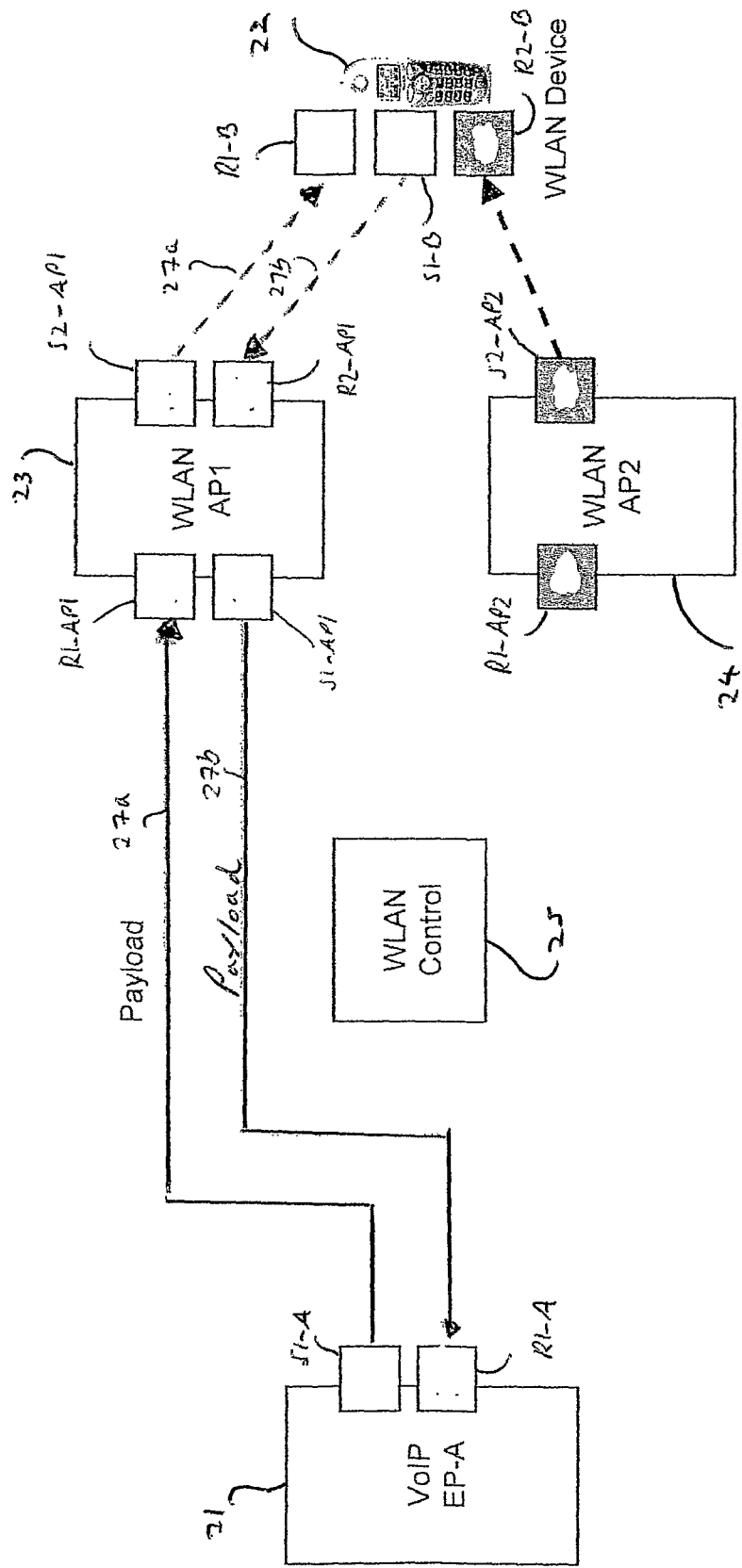
Figure 16:
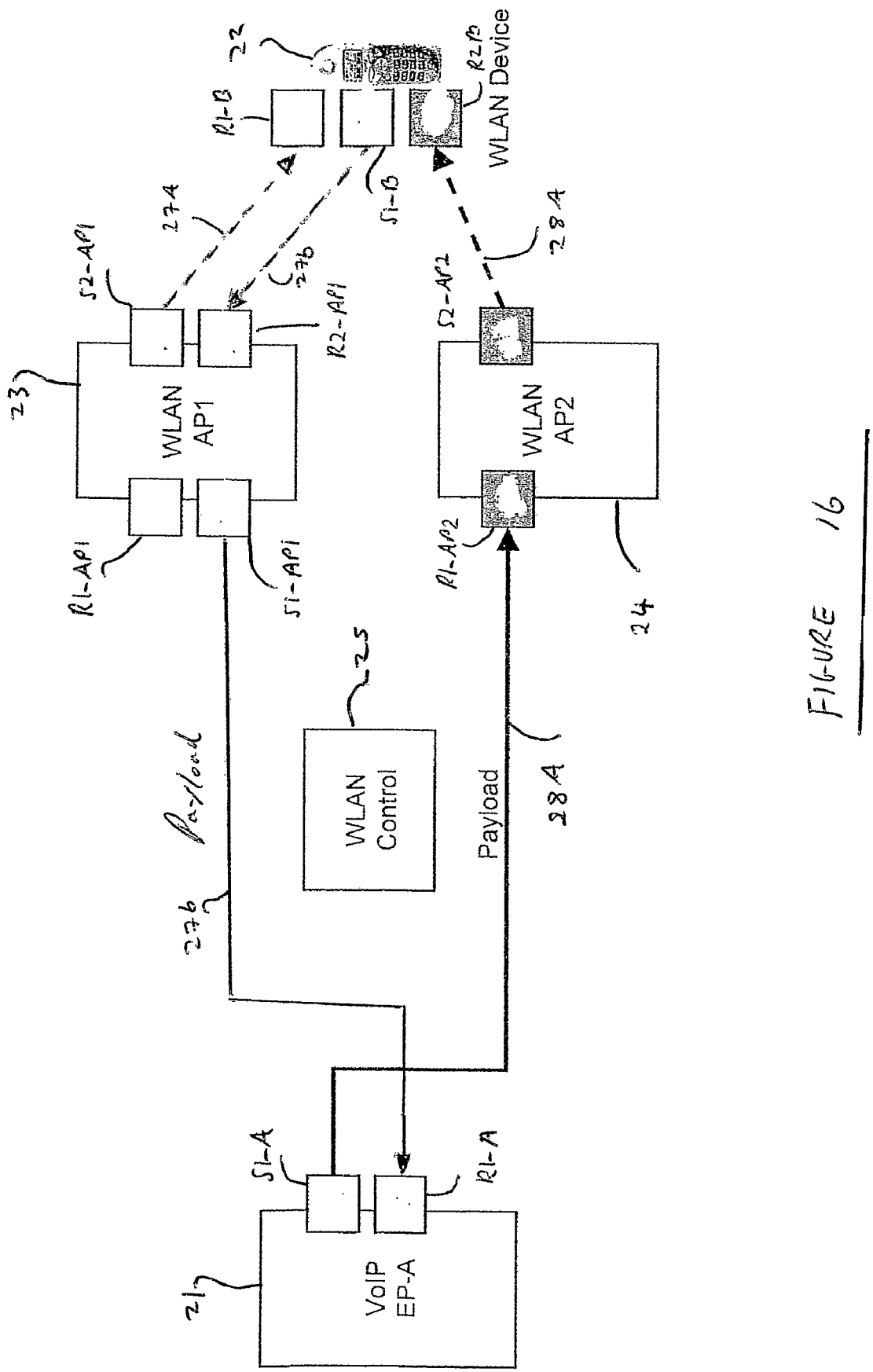
Figure 17:
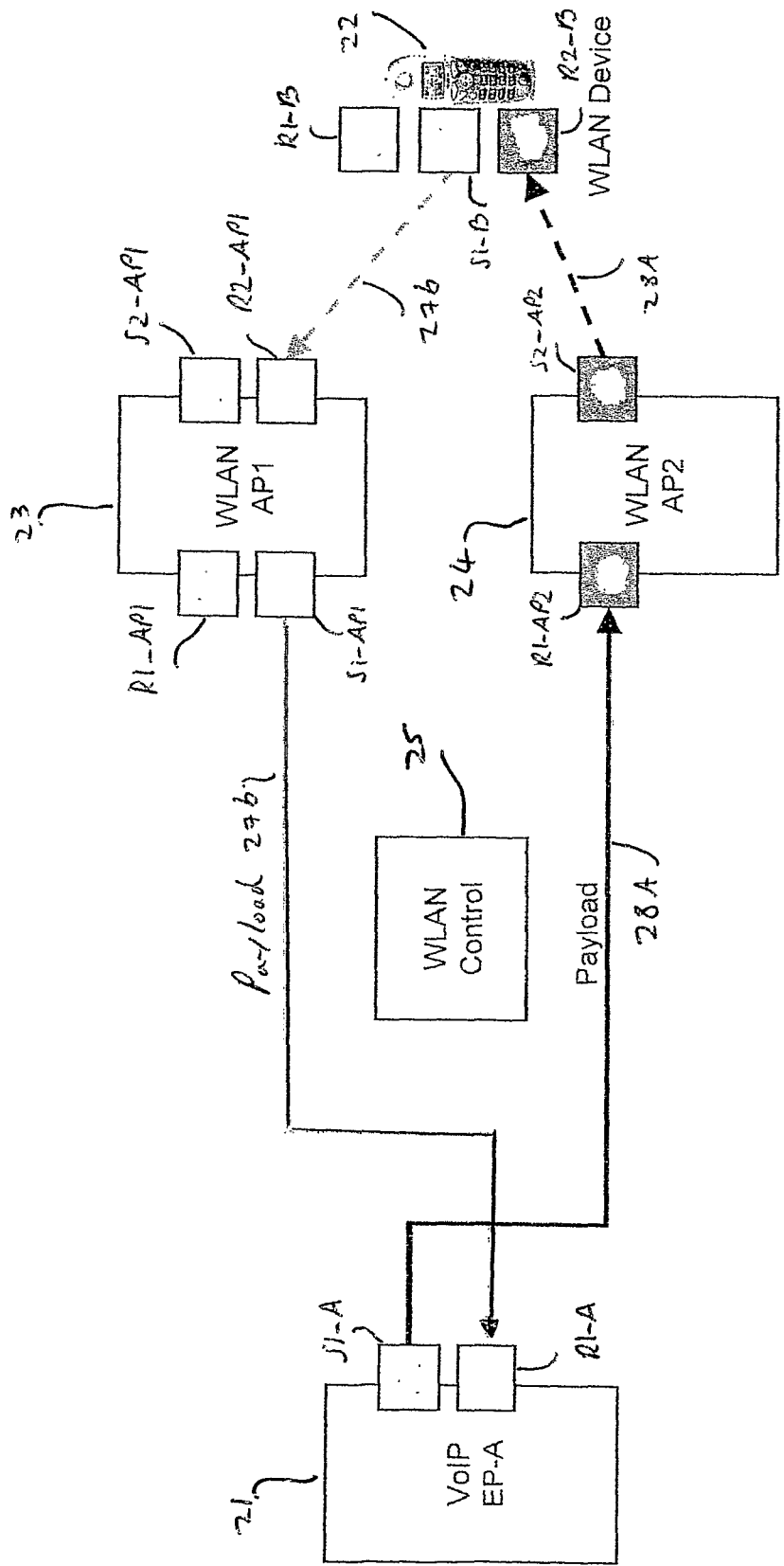
Figure 18:
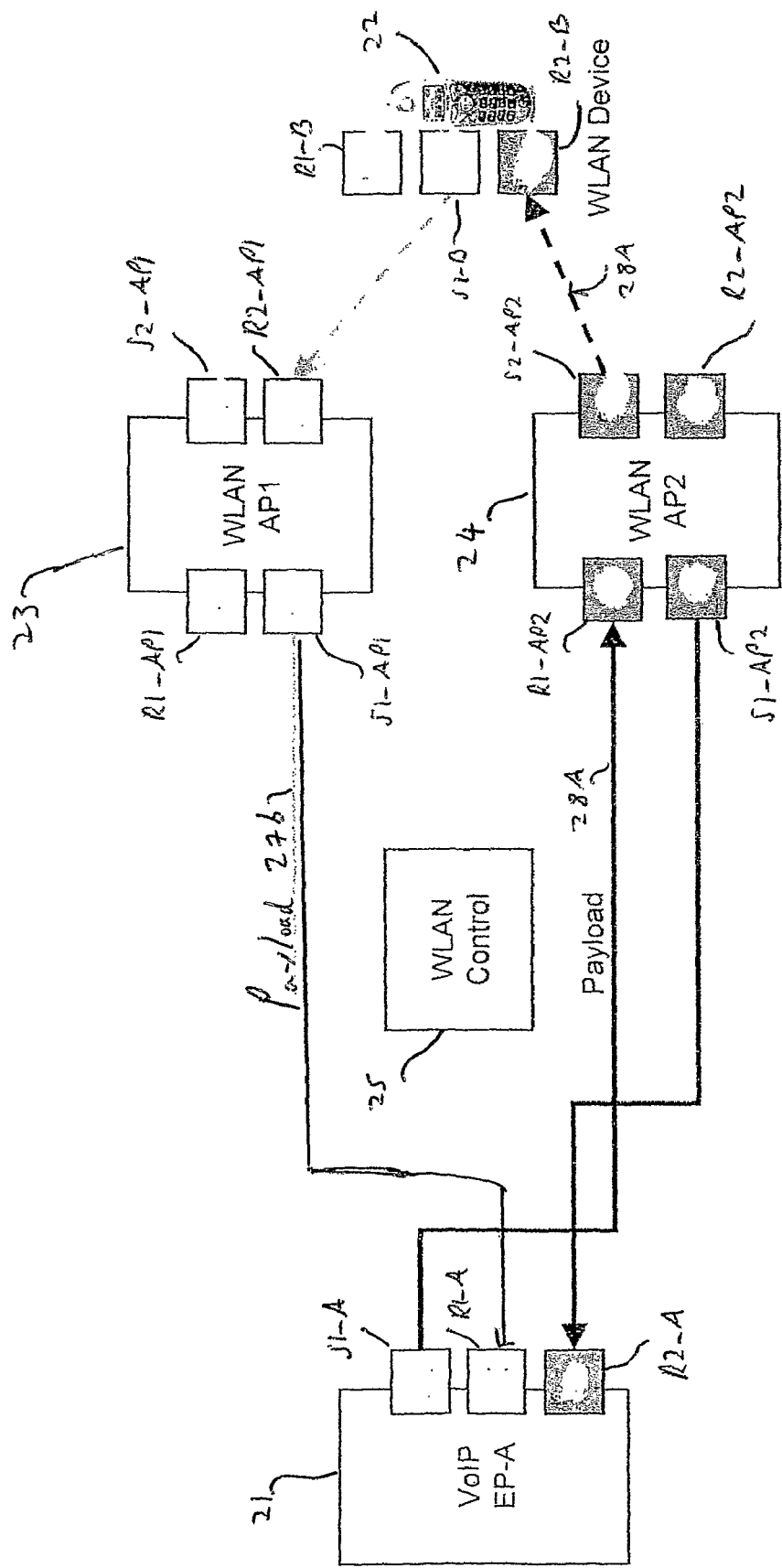
Figure 19:
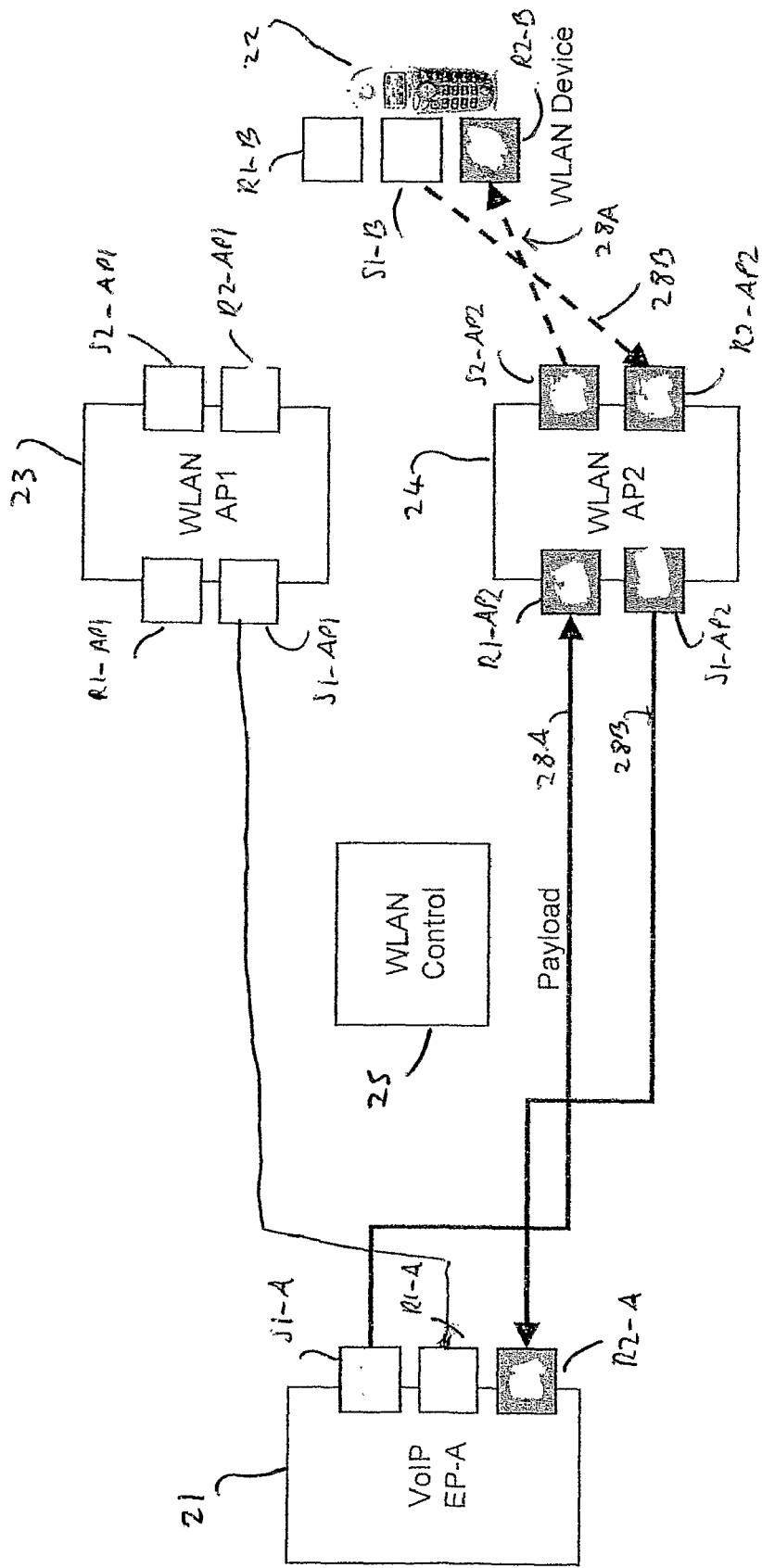
Figure 20:
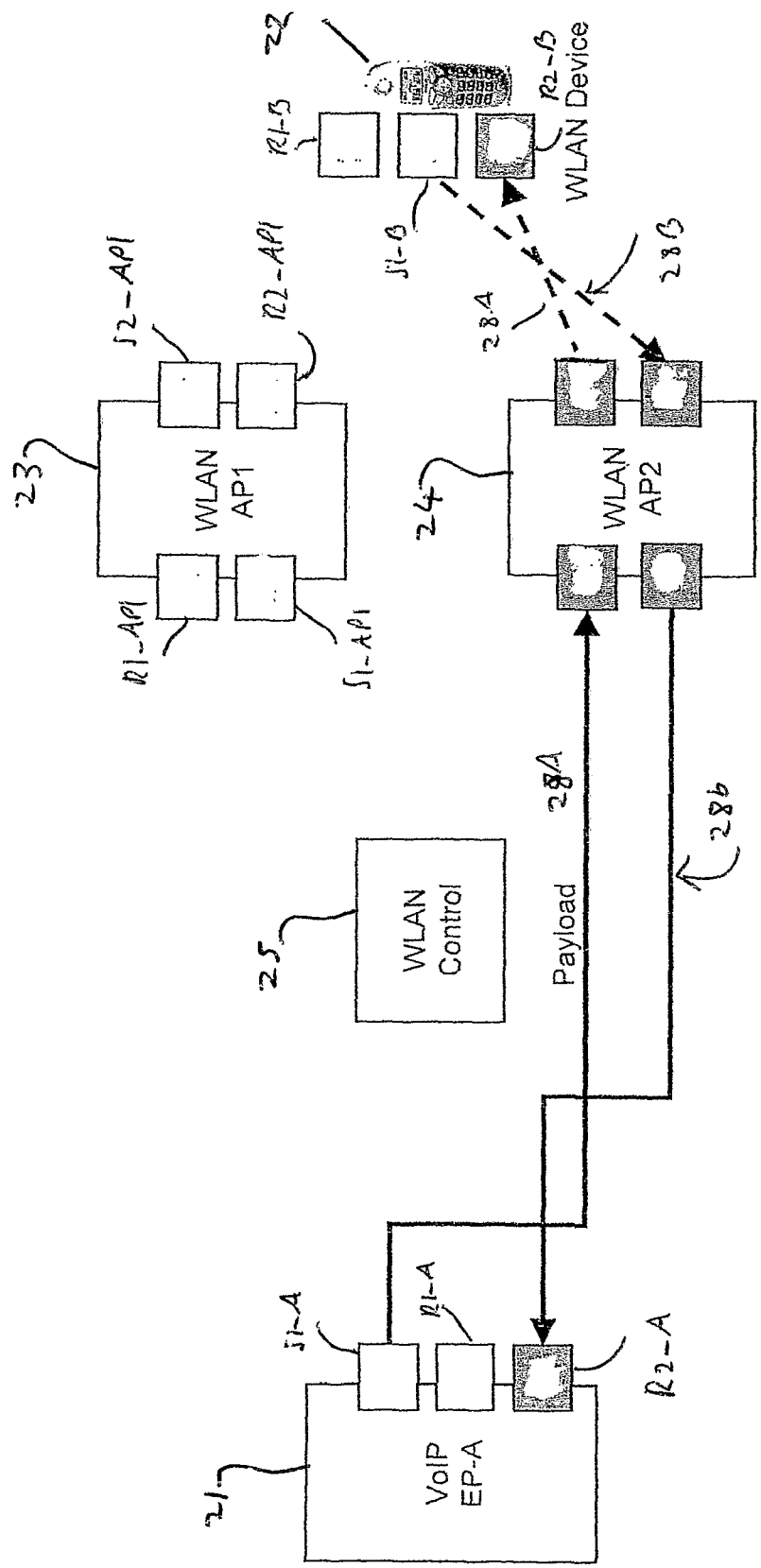
Figure 21:
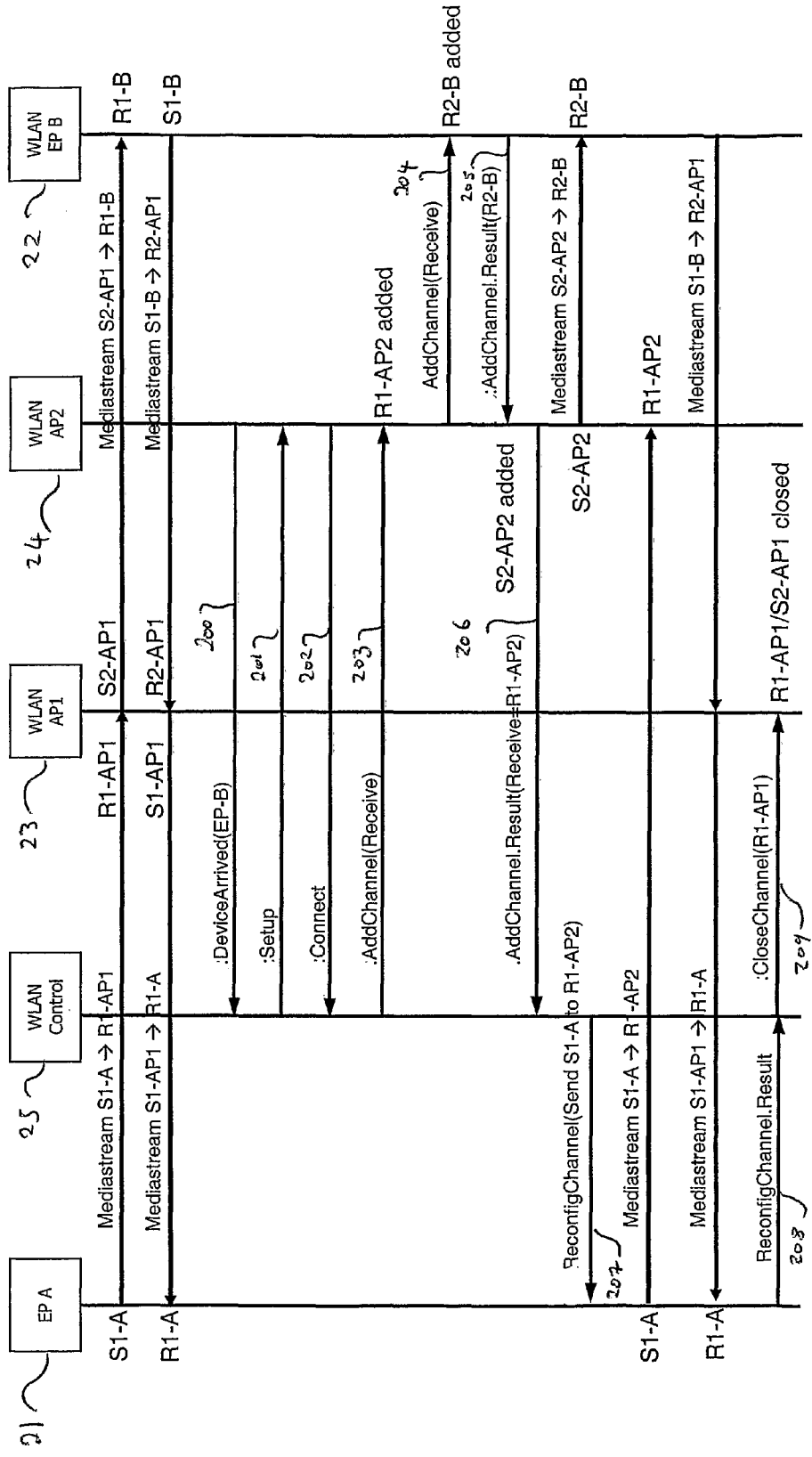
FIG. 21 illustrates another message flow diagram.
Figure 21:
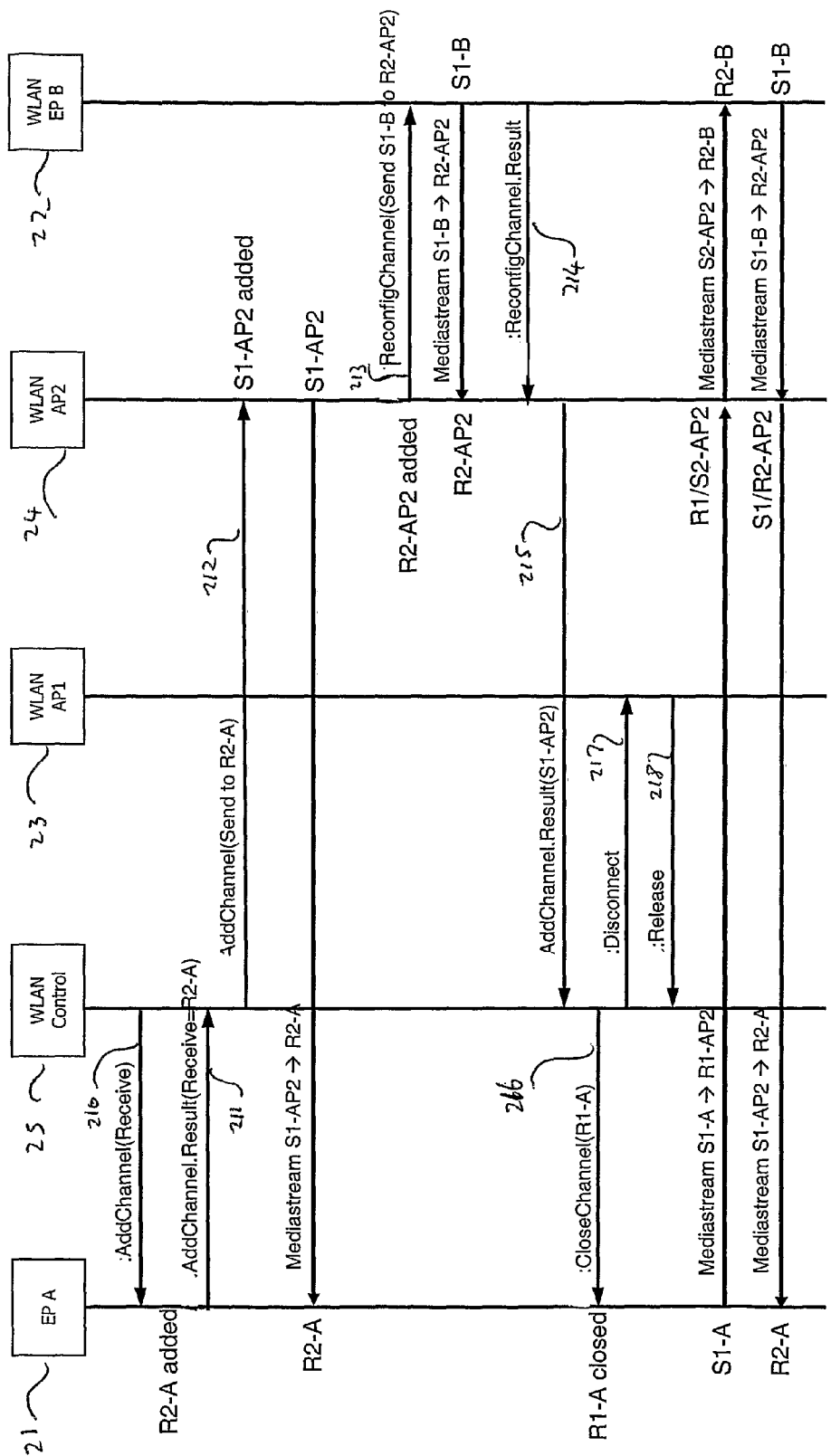

FIG. 11 illustrates an alternative flow of messages that may be sent from the PBX 4 to the first 2 and second 3 VoIP end points using H.460.6 to implement an embodiment of the invention.

In order to be able to synchronise the payload packets on the old and new payload path, e.g. if there are different message delivery durations for the voice packets travelling through the network, the receiving end point has to be able to re-order the received packets. To allow the endpoint to re-order packets a packet counter can be realized, e.g. EP-A sends packet number seventeen towards R1-B and then switches sending packet number eighteen towards R2-B. EP-B receives packet 18 on R2-B before packet 17 on R1-B. Because EP-B knows that the last packet received was packet number sixteen, EP-B is able to re-order the packets in the correct sequence.

Realization of such a synchronization method can be done following several approaches, for example, using Silence Insertion Descriptor (SID) (if SID is supported) together with a flag bit in the RTP header. As is well known, SID frames are inserted into audio streams to include "comfort noise" during periods of silence. In the above described example, the next occurrence of a SID frame following the set up of the new media stream could be used as the synchronisation point for switchover. A SID frame would be inserted on the old payload path before switching over to the new payload path. On the new payload path also a SID frame would be sent, before transmission of the payload packets starts. This would allow the receiving end point to synchronise the two payload steams.

Alternatively, Real Time Protocol Control Protocol (RTCP) sender reports (SR), which contain statistics such as timestamps and packet sequence numbers and source description (SDES) items that explicitly identify the source of audio packets may be used to compute the synchronisation point for switching to the new media path.

Other such proprietary protocol extension may also be used for this purpose.

A further embodiment of the invention will now be described with respect to FIGS. 12 to 22.

Turning first to FIG. 12, a communication system 20 comprises a VoIP end point 21, a Wireless Local Area Network (WLAN) user terminal 22, a first WLAN access point 23, a second WLAN access point 24 and a WLAN controller 25. In this embodiment, the first VoIP end point 21 is again an IP telephone such as the Siemens optipoint™ 400 IP telephone.

In this example, the VoIP end point 21 and the WLAN user terminal 22 have an established two-way voice connection between themselves. The WLAN user terminal 22 is being serviced by the first WLAN access point 23. A connection oriented signalling path 26 runs between the VoIP end point 21 and the WLAN controller 25, and between the WLAN controller 25 and the WLAN user terminal 22 via the first WLAN access point 23. A payload path 27 runs between the VoIP end point 21 and the WLAN user terminal 22 via the first WLAN access point 23.

In this embodiment of the invention, the WLAN user terminal 22 moves from the region served by the first WLAN access point 23 to the region served by the second WLAN access point 24. A handover of the WLAN user terminal 22 from the first WLAN access point 23 to the second WLAN access point 24 occurs. During the handover, a new payload path 28 is established between the VoIP end point 21 and the WLAN user terminal 22 via the second WLAN access point 24 and a new connection oriented signalling path 29 is established that runs between the WLAN controller 25 and the second WLAN access point 24 and between the second WLAN access point 24 and the WLAN user terminal 22. The connection oriented leg of the signalling path between VoIP end point 21 and the WLAN controller 25 may stay unchanged. This is illustrated in FIG. 13. In addition to the connection oriented signalling path between the WLAN controller 25 and the WLAN user terminal 22 (traversing either the WLAN access point 23 or 24), connection less signalling paths between the WLAN controller 25 and the WLAN access points 23 and 24 exist, allowing WLAN controller and access point communication. This allow the second WLAN access point 24 to inform the WLAN controller 25, that a WLAN user terminal has arrived in the covered service area. For simplicity, this signalling path is omitted in the figures.

Referring now to FIGS. 14 to 22, the process by which the new payload path 28 is established will be described. For simplicity, no signalling paths are not shown in FIGS. 14 to 20.

The initial payload path 27 comprises a forward payload path 27a and a reverse payload path 27b. The VoIP endpoint 21 transmits its payload using send channel S1-A over the forward payload path 27a to receive channel R1-AP1 of the first WLAN access point 23. The first WLAN access point 23 transmits the received payload using transmit channel S2-AP1 over the air using the forward payload path 27a to receive channel R1-B of the WLAN user terminal 22. The WLAN user terminal 22 transmits its payload using send channel S1-B over the air using the reverse payload path 27b to receive channel R2-AP1 of the first WLAN access point 23. The first WLAN access point 23 transmits this received payload using transmit channel S1-AP1 over the reverse payload path 27b to receive channel R1-A of the VoIP endpoint 21.

At step 200, the second WLAN access point 24 sends a message to the WLAN controller 25 informing it, that the WLAN user terminal 22 has arrived in the service area covered by the second WLAN access point 24. The WLAN controller 25 then sends a Setup message to the second WLAN access point 24 requesting the establishment of a communication session between the WLAN controller 25 and the WLAN access point 24 on behalf of WLAN user terminal 22. The WLAN access point 24 responds with a Connect message confirming the establishment of the communication session in step 202.

Next, in step 203 the WLAN access point 24 is requested by the WLAN Controller 25 to add a new receive channel R1-AP2 for receiving payload from the transmission channel S1-A of the VoIP end point 21 over the new forward payload path 28A. In step 204 the WLAN access point 24 instructs the WLAN user terminal 22 to add a new receive channel R2-B and to be prepared to receive media on this channel. The WLAN user terminal 22 then responds to the second WLAN access point 24, step 205, confirming the set up of the new receive channel. Receiving this confirmation, the second WLAN access point 24 establishes a new transmission channel S2-AP2 towards the receive channel R2-B of the WLAN user terminal 22 to set up the new forward payload path 28A.

After setting up the new receive channel R1-AP2 and the new transmission channel S2-AP2, the second WLAN access point 24 sends a message to the WLAN controller 25 in step 206, informing it that these channels are set up. At step 207, the WLAN controller sends a message to the VoIP end point 21 requesting that it re-configures its transmission channel S1-A to transmit payload to the receive channel R1-AP2 of the second WLAN access point 24 for onwards transmission from the transmission channel S2-AP2 of the second WLAN access point 24 to the receive channel R2-B of the WLAN user terminal 22. The VoIP end point 21 re-configures its transmission channel S1-A accordingly, and payload is transmitted on the new forward payload path 28A.

At step 208, the VoIP end point 21 sends a message to the WLAN controller 25 informing it that the transmission channel S1-A has been re-configured, and at step 209, the WLAN controller 25 sends a message to the first WLAN access point 23 requesting it to close its receive path consisting of R1-AP1 and S2-AP1, which it does. In addition the WLAN controller 25 could inform the WLAN user terminal 22 to close the receive channel R1-B, which is no longer needed, although such a step is not illustrated in FIG. 21.

In general closing R1-AP1, S2-AP1 and R1-B could be also delayed until successful establishment of the complete payload path, to allow the WLAN user terminal 22 to stay in the region served by the first WLAN access point 23, should the user leaves the region served by the second WLAN access point 24 again.

At step 210, the WLAN controller 25 sends a message to the VoIP end point 21 instructing it to set up a new receive channel R2-A. The VoIP end point 21 sets up the new channel and at step 211 sends a message to the WLAN controller 25 to inform it accordingly. At step 212, the WLAN controller 25 sends a message to the second WLAN access point 24 requesting it to set up a new send channel S1-AP2 for sending payload towards the receive channel R2-A of the VoIP end point 21. Next, step 213, the WLAN access point 24 creates a receive channel R2-AP2 and sends a message to the WLAN user terminal 22 requesting it to reconfigure its transmission channel S1-B to transmit payload to the receive channel R2-AP2 of the second WLAN access point 24 for onwards transmission from that access point's transmission channel S1-AP2 to the receive channel R2-A of the VoIP end point 21. At this point in time the new payload path 28 is established in forward and reverse direction completely.

After reception of a channel re-configuration result from the WLAN user terminal 22, step 214, the WLAN access point 24 sends a confirmation message to the WLAN controller 25, step 215. On receipt of this message, the WLAN controller 25 sends a message to the VoIP end point 21 requesting it to close the initial receive channel R1-A, step 216. The WLAN controller 25 then sends a disconnect message to the first WLAN access point 23, step 217, which replies with a release message, step 218. This closes the signalling connection between the WLAN controller 25 and the first WLAN access point 23 on behalf of the WLAN user terminal 22 and the handover is then complete.

Any of the synchronisation methods described with respect to the first embodiment, may also be used with the second embodiment.

Having thus described the present invention by reference to preferred embodiments it is to be well understood that the embodiments in question are exemplary only and that modifications and variations such as will occur to those possessed of appropriate knowledge and skills may be made without departure from the scope of the invention as set forth in the appended claims.

The invention claimed is:

1. A method for switching from an established media path to a new media path for packets transmitted between first and second end points in a packet based network, the method comprising:
    transmitting, by a network element, an instruction to the second end point instructing it to set up a new receiving channel for receiving packets transmitted from the first end point over the new media path;
    transmitting, by the network element, an instruction to the first end point instructing it to configure a sending channel to send packets over the new media path for reception on the new receiving channel of the second end point;
    wherein the first endpoint, after being informed by the network element that the new receiving channel is setup, reconfigures the sending channel to begin sending packets over the new media path for reception on the new receiving channel of the second end point to remove the network element from a media path between the first and second end points; and
    wherein for a time period, the second end point monitors for packets simultaneously on both its new receiving channel and an established receiving channel configured to receive packets transmitted from the first end point over the established media path.

2. A method according to claim 1, further comprising:
    transmitting an instruction to the first end point instructing it to set up a new receiving channel for receiving packets transmitted from the second end point over the new media path;

transmitting an instruction to the second end point instructing it to configure sending channel to send packets over the new media path for reception on the new receiving channel of the first end point; and wherein for a time period during the switching, the first end point monitors for packets simultaneously on both its new receiving channel and an established receiving channel configured to receive packets transmitted from the second end point over the established media path.

3. A method according to claim 2 wherein either of the first and second end point is able to synchronize media packets received via its established receiving channel and media packets received via its new receiving channel into one stream.

4. A method according to claim 3 wherein packet counters are used to allow end point reordering of media packets.

5. A method according to claim 3 wherein an occurrence of a Silence Insertion Descriptor (SID) frame is used as a synchronisation point by either of the first and second end points for switching from the established media path to the new media path.

6. A method according to claim 3 wherein sender reports (SR) of the Real Time Protocol Control Protocol (RTCP) which contain statistics such as timestamps and packet sequence numbers and source description (SDES) are used by either of the first and second end points for synchronising switching from the established media path to the new media path.

7. A method according to claim 3 wherein proprietary enhancements of RTP/RTCP are used by either of the first and second end points for synchronising switching from the established media path to the new media path.

8. A method according to claim 1, wherein, at least one of the first and second end points is a VoIP end point.

9. A method according to claim 1, wherein the end point supports RTP/RTCP and SIP or H.323.

10. A method according to claim 1, wherein the network element is a private branch exchange (PBX).

11. Apparatus for switching from an established media path to a new media path for packets transmitted between first and second end points in a packet based network, the apparatus comprising:

means for transmitting, by a network element, an instruction to the second end point instructing it to set up a new receiving channel for receiving packets transmitted from the first end point over the new media path;

means for transmitting, by the network element, an instruction to the first end point instructing it to configure a sending channel to send packets over the new media path for reception on the new receiving channel of the second end point;

wherein the first endpoint, after being informed by the network element that the new receiving channel is setup, reconfigures the sending channel to begin sending packets over the new media path for reception on the new receiving channel of the second end point to remove the network element from a media path between the first and second end points; and wherein for a time period, the second end point monitors for packets simultaneously on both its new receiving channel and an established receiving channel configured to receive packets transmitted from the first end point over the established media path.

12. An apparatus according to claim 10, wherein the network element is a private branch exchange (PBX).

13. A method for switching from an established media path to a new media path for packets transmitted between first and second end points in a packet based network, the method comprising:

transmitting, by a network element, an instruction to the second end point instructing it to set up a new receiving channel for receiving packets, via a second wireless access point, transmitted from the first end point over the new media path;

transmitting, by the network element, an instruction to the first end point instructing it to configure a sending channel to send packets over the new media path for reception on the new receiving channel of the second end point;

wherein for a time period, the second end point monitors for packets simultaneously on both its new receiving channel and an established receiving channel configured to receive packets, via a first wireless access point, transmitted from the first end point over the established media path; and wherein the first endpoint, after being informed by the network element that the new receiving channel is setup, reconfigures the sending channel to begin sending packets over the new media path for reception on the new receiving channel of the second end point to remove the first wireless access point from a media path between the first and second end points.

14. A method according to claim 13, wherein the network element is a wireless local area network (WLAN) controller.

* * * * *